(12) United States Patent  
Messingher Lang et al.

(10) Patent No.: US 11,381,797 B2  
(45) Date of Patent: Jul. 5, 2022

(54) VARIABLE AUDIO FOR AUDIO-VISUAL CONTENT

(71) Applicant: Apple Inc., Cupertino, CA (US)

(72) Inventors: Shai Messingher Lang, Santa Clara, CA (US); Alexandre Da Veiga, San Francisco, CA (US); Spencer H. Ray, San Jose, CA (US); Symeon Delikaris Manias, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/358,263

(22) Filed: Jun. 25, 2021

(65) Prior Publication Data

US 2021/0321070 A1    Oct. 14, 2021

Related U.S. Application Data

(60) Provisional application No. 63/052,519, filed on Jul. 16, 2020.

(51) Int. Cl.
| | |
|---|---|
| *H04N 5/77* | (2006.01) |
| *H04N 9/802* | (2006.01) |
| *G11B 27/10* | (2006.01) |
| *G10L 25/51* | (2013.01) |
| *H04S 7/00* | (2006.01) |
| *H04N 5/932* | (2006.01) |

(52) U.S. Cl.
CPC ............. *H04N 9/802* (2013.01); *G10L 25/51* (2013.01); *G11B 27/10* (2013.01); *H04S 7/302* (2013.01)

(58) Field of Classification Search
CPC ........ G10L 25/51; G11B 27/10; H04N 9/802; H04S 7/302

USPC ....... 386/224, 239, 241, 248, 285, 338, 201, 386/202, 207, 208

See application file for complete search history.

(56) References Cited

U.S. PATENT DOCUMENTS

| | | | |
|---|---|---|---|
| 7,823,055 B2 | 10/2010 | Sull et al. | |
| 10,448,189 B2 | 10/2019 | Link | |
| 10,607,650 B2 | 3/2020 | Chordia et al. | |
| 10,643,660 B2 | 5/2020 | McIntosh et al. | |
| 2007/0061352 A1 | 3/2007 | Dimitrova et al. | |
| 2019/0391783 A1* | 12/2019 | Moore | H04R 1/403 |
| 2021/0072831 A1* | 3/2021 | Edwards | G06F 3/013 |

FOREIGN PATENT DOCUMENTS

JP        2564003 A1 *   4/2007

* cited by examiner

*Primary Examiner* — Robert Chevalier  
(74) *Attorney, Agent, or Firm* — Thompson Hine LLP (57) ABSTRACT

Various implementations disclosed herein include devices, systems, and methods that that modify audio of played back AV content based on context in accordance with some implementations. In some implementations audio-visual content of a physical environment is obtained, and the audio-visual content includes visual content and audio content that includes a plurality of audio portions corresponding to the visual content. In some implementations, a context for presenting the audio-visual content is determined, and a temporal relationship between one or more audio portions of the plurality of audio portions and the visual content is determined based on the context. Then, synthesized audio-visual content is presented based on the temporal relationship.

28 Claims, 6 Drawing Sheets

VARIABLE AUDIO FOR AUDIO-VISUAL CONTENT

CROSS-REFERENCE TO RELATED APPLICATIONS

This Application claims the benefit of U.S. Provisional Application Ser. No. 63/052,519 filed Jul. 16, 2020, which is incorporated herein in its entirety.

TECHNICAL FIELD

The present disclosure generally relates to systems, methods, and devices for capturing audio-visual (AV) content or playback of captured AV content.

BACKGROUND

Various techniques for capturing AV content exist. However, existing technologies for playing back AV content have various deficiencies.

SUMMARY

Various implementations disclosed herein include devices, systems, and methods that present or modify audio of captured AV content during playback based on context. In some implementations, the context is determined based on an action of a user and/or the user's position. Context may include whether AV content is selected or unselected, whether the user is looking at or away from the AV content, or whether the user is within a prescribed distance of the AV content in an extended reality (XR) environment.

In one example, the AV content includes a photo and a first context is identified based the photo being unselected, the user looking at something other than the photo, the user standing more than a threshold distance away from the photo in an XR environment, or the user moving away from the photo in the XR environment. Based on detecting the first context, the photo is provided with a loop of a selected portion of the associated audio content. In contrast, in this example, a second context is identified based on the photo being selected, the user looking at the photo, the user standing close to the photo in the XR environment, or the user moving towards the photo in the XR environment. Based on detecting the second context, the photo is provided with different or additional portions of the associated audio (e.g., full audio/spatialized audio). As a specific example, when a user is not looking at a photo of fireworks, the photo may be provided with a loop of some ambient fireworks sounds but, when the user looks at the photo, the photo may be provided with spatialized firework sounds and audience applause.

In some implementations, the audio content for each of multiple different contexts is selected based on metadata that identifies the audio content's source, type, or other semantic information (e.g., the photographer's voice, ambient audio, and/or a plurality of spatialized audio streams like surround sound).

In some implementations, a temporal relationship between audio portions and the visual content is determined based on the context and used to render the AV content. The temporal relationship may be determined based on rules that specify in which contexts various types of audio portions will be provided.

In some implementations, at an electronic device having a processor, a method includes obtaining audio-visual content of a physical environment, wherein the audio-visual content includes visual content and audio content including a plurality of audio portions corresponding to the visual content. In some implementations, a context is determined for presenting the audio-visual content, and a temporal relationship is determined between one or more audio portions of the plurality of audio portions and the visual content, the temporal relationship determined based on the context. In some implementations, synthesized audio-visual content is presented based on the temporal relationship.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Figure 1:
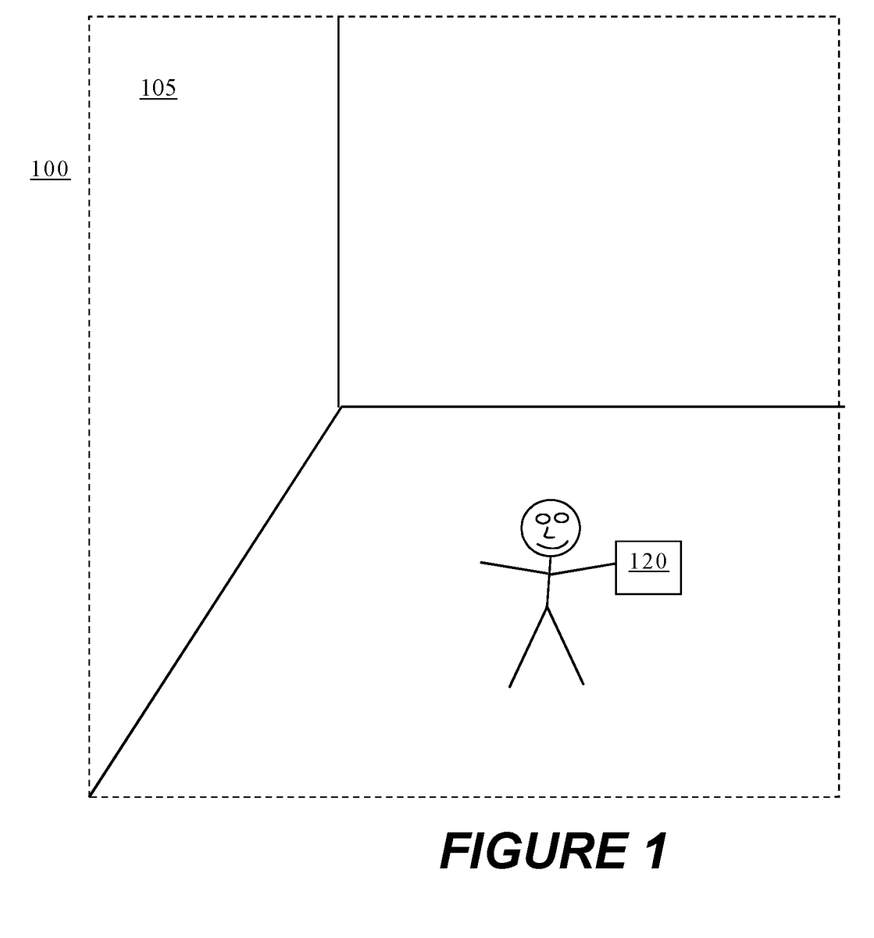
FIG. 1 is a diagram of an example operating environment in accordance with some implementations.

FIG. 1 illustrates an example operating environment 100 In accordance with some implementations. As a non-limiting example, the operating environment 100 includes an electronic device 120 (e.g., a laptop), which may be in a physical environment 105.

A physical environment refers to a physical world that people can interact with and/or sense without the aid of electronic systems. A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some implementations, the electronic device presenting the XR environment is a single device that may be hand-held (e.g., mobile phone, a tablet, a laptop, etc.) or worn (e.g., a watch, a head-mounted device (HMD), etc.). In some implementations, functions of the electronic device are accomplished via two or more communicating (e.g., wired or wireless) devices, for example additionally including an optional base station. Other examples include a laptop, desktop, server, or other such device that includes additional capabilities in terms of power, CPU capabilities, GPU capabilities, storage capabilities, memory capabilities, and the like.

Figure 2:
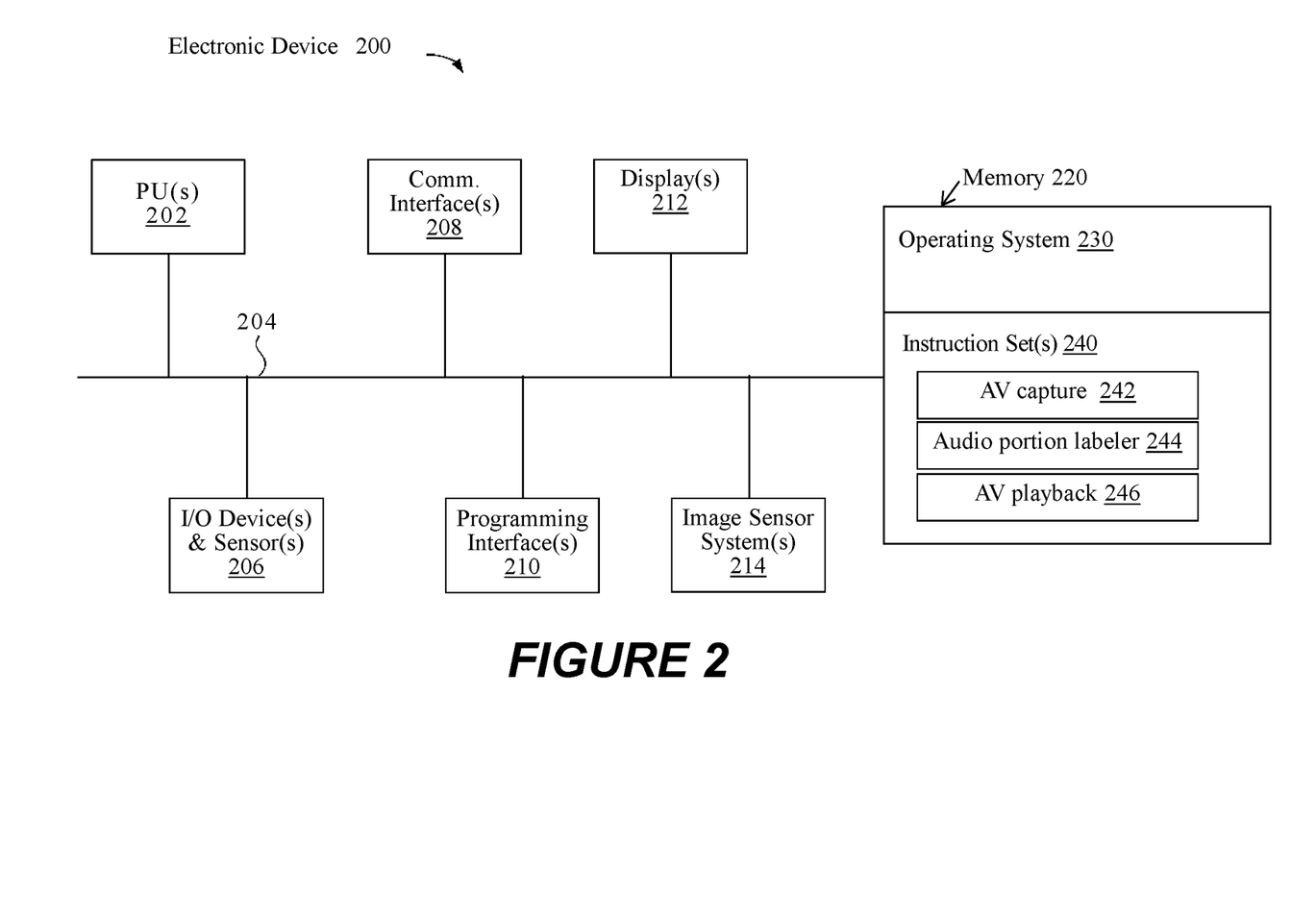
FIG. 2 is a diagram of an example electronic device in accordance with some implementations.

FIG. 2 is a block diagram of an example device 200. Device 200 illustrates an exemplary device configuration for the device 120. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 200 includes one or more processing units 202 (e.g., microprocessors, ASICs, FPGAs, GPUs, CPUs, processing cores, or the like), one or more input/output (I/O) devices and sensors 206, one or more communication interfaces 208 (e.g., USB, FIRE-WIRE, THUNDERBOLT, IEEE 802.3x, IEEE 802.11x, IEEE 802.16x, GSM, CDMA, TDMA, GPS, IR, BLU-ETOOTH, ZIGBEE, SPI, I2C, or the like type interface), one or more programming (e.g., I/O) interfaces 210, one or more displays 212, one or more interior or exterior facing sensor systems 214, a memory 220, and one or more communication buses 204 for interconnecting these and various other components.

In some implementations, the one or more communication buses 204 include circuitry that interconnects and controls communications between system components. In some implementations, the one or more I/O devices and sensors 206 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 212 are configured to present content to the user. In some implementations, the one or more displays 212 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), or the like display types. In some implementations, the one or more displays 212 correspond to diffractive, reflective, polarized, holographic, etc. waveguide displays. For example, the electronic device 200 may include a single display. In another example, the electronic device 200 includes a display for each eye of the user.

In some implementations, the one or more interior or exterior facing sensor systems 214 include an image capture device or array that captures image data or an audio capture device or array (e.g., microphone) that captures audio data. The one or more image sensor systems 214 may include one or more RGB cameras (e.g., with a complimentary metal-oxide-semiconductor (CMOS) image sensor or a charge-coupled device (CCD) image sensor), monochrome cameras, IR cameras, event-based cameras, or the like. In various implementations, the one or more image sensor systems 214 further include an illumination source that emits light such as a flash. In some implementations, the one or more image sensor systems 214 further include an on-camera image signal processor (ISP) configured to execute a plurality of processing operations on the image data.

The memory 220 includes high-speed random-access memory, such as DRAM, SRAM, DDR RAM, or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium.

In some implementations, the memory 220 or the non-transitory computer readable storage medium of the memory 220 stores an optional operating system 230 and one or more instruction set(s) 240. The operating system 230 includes procedures for handling various basic system services and for performing hardware dependent tasks. In some implementations, the instruction set(s) 240 include executable software defined by binary information stored in the form of electrical charge. In some implementations, the instruction set(s) 240 are software that is executable by the one or more processing units 202 to carry out one or more of the techniques described herein.

In some implementations, the instruction set(s) 240 include an AV capture instruction set(s) 242 that is executable by the processing unit(s) 202 to capture or generate AV content from a physical environment or in an XR environment.

In some implementations, the instruction set(s) 240 include an audio portion labeler instruction set(s) 244 that is executable by the processing unit(s) 202 to label separate audio portions of the audio content of the captured AV content. In some implementations, the separate audio portions of the audio content of the captured AV content are semantically labeled based on corresponding visual content, the audio content itself, or corresponding metadata of the captured AV content, or combinations thereof.

In some implementations, the instruction set(s) 240 include an AV playback instruction set(s) 246 that is executable by the processing unit(s) 202 to playback or render AV content. In some implementations, the AV playback instruction set(s) 242 is configured to present or modify audio of captured AV content during playback based on context. In some implementations, the context for rendering the re-mixed audio portions are determined based on actions of the user with respect to the played back AV content in an XR environment.

Although the instruction set(s) 240 are shown as residing on a single device, it should be understood that in other implementations, any combination of the elements may be located in separate computing devices. FIG. 2 is intended more as a functional description of the various features which are present in a particular implementation as opposed to a structural schematic of the implementations described herein. As recognized by those of ordinary skill in the art, items shown separately could be combined and some items could be separated. For example, an actual number of instruction sets and the division of particular functions and how features are allocated among them will vary from one implementation to another and, in some implementations, depends in part on the particular combination of hardware, software, or firmware chosen for a particular implementation.

Various implementations disclosed herein include devices, systems, and methods that capture audio-visual (AV) content and playback the captured visual content using variable audio to enhance the played back AV content. In some implementations, audio portions of the captured audio content are semantically labeled and separated for playback. In some implementations, the audio portions may be labeled based on information from the captured audio content itself such as types of audio sources. In some implementations, the audio portions may be labeled based on information from the captured video content itself such as scene information. In another example, the audio portions may be labeled using metadata captured with the AV content. In some implementations, audio portions of sound from any segment of the captured AV content are played back in different ways or in different orders relative to the same captured visual content. In some implementations, separate audio portions from any portion of the captured audio content are decoupled (e.g., not synchronized on a playback timeline) from the visual content. In some implementations, the labeled audio portions are aligned, modified, or re-aligned to the visual content dynamically during playback based on actions with respect to an XR environment of a user of a viewing electronic device.

In some implementations, an AV capturing electronic device captures AV content using one or more sensors. In some implementations, captured AV content includes captured AV data. In some implementations, captured AV content includes captured 3D AV data. In some implementations, the captured AV content includes visual content (e.g., video or multiple frames of image data), audio content, and metadata.

In some implementations, the AV capturing electronic device can be hand held, head mounted, remotely controlled, or the like. In some implementations, the AV capturing electronic device is a single electronic device. In some implementations, the AV capturing electronic device is a plurality of electronic devices.

In some implementations, the visual content of the captured AV content is from a single video source (e.g., single outward facing image sensor) in a physical environment. In some implementations, the visual content is from a single video source (e.g., single inward facing image sensor). In some implementations, the recorded visual content is from a plurality of directional video sources (e.g., front and back facing image sensors). In some implementations, the visual content is from a N-channel video array (e.g., array of image sensors). In some implementations, recorded 3D video content is a combination of such inputs. In some implementations, the recorded 3D video content will have 360° of image and depth information.

In some implementations, the audio content of the captured AV content is from a single audio source (e.g., single outward facing audio sensor) in a physical environment. In some implementations, the recorded audio content is from a single audio source (e.g., single inward facing audio sensor). In some implementations, the audio content is from a plurality of directional audio sources (e.g., front and back facing image sensors). In some implementations, the recorded audio content is from N-channel microphones or surround sound sensors. In some implementations, recorded audio content is a combination of such inputs. In some implementations, the audio content includes spatialized audio information (e.g., surround sound).

In some implementations, metadata is recorded during the capture of the AV content. In some implementations, the recorded metadata includes the capabilities of the capturing devices such as sensors, hardware, software applications, or additional stored data. In some implementations, the recorded metadata further includes semantic information about the captured video content or captured audio content. In some implementations, metadata about the capture conditions is recorded such as time of day, lighting, electromagnetic data, location (e.g., GPS or satellite), subject, input/output data, image capturing device movement or motion, or additional characteristics about the physical environment involved in recording the 3D video data. In some implementations, metadata further includes the position and orientation of one or more capturing electronic devices (e.g., video-capture-device(s) or audio-capture devices) during the recording of the 3D AV content.

In some implementations, additional data related to the placement of the AV content in the physical environment (e.g., VIO, SLAM, segmentations) in which the 3D AV content is captured. In some implementations, the placement information includes positional references such as identifying a ground plane in the 3D video data and the relative position of a subject of the 3D video to the ground plane. In some implementations, the placement information includes positional references such as identifying spatialized audio orientations. In some implementations, the spatialized audio orientation includes positioning a set of virtual audio sources to form a spherical arrangement of preset dimensions. In some implementations, any virtual content or data involved in the capture of the 3D AV content are determined and recorded.

In some implementations, when the AV content is being captured, processing of the AV data for playback of synthesized AV content at a viewing electronic device is not being performed and occurs after the capture. In some implementations, processing the AV data starts during the AV content capture, but is completed after the AV content is captured. In some implementations, processing the AV data starts during the AV content capture, and occurs in real-time, which allows real-time playback of synthesized AV content at a viewing electronic device. In some implementations, the viewing electronic device is the capturing electronic device.

In some implementations, processing the captured 3D AV data includes labelling audio portions of the audio content. In some implementations, processing the captured 3D AV data includes segmenting audio portions of the audio content. In some implementations, semantic labelling separates the audio content from the captured AV data into labeled audio portions. In some implementations, the semantic labelling includes semantic labelling based on analyzing corresponding image content, based on analyzing the audio content itself, based on analyzing corresponding metadata, or combinations thereof. In some implementations, the sematic labeling is a "black box" or machine learning (ML) that accounts for combinations of the audio content, video content, or metadata content. In one implementation, the sematic labeling includes ML networks developed for scene understanding based on the image content or scene understanding base on the audio content.

In some implementations, the semantically labelling uses information based on categories of audio sources of the captured audio content. In some implementations, the categories of audio sources may include a point source, stereo source, directional source, 2D spatialized audio (e.g., surround sound), 3D spatialized audio (e.g., sound sources positioned at locations in a surrounding sphere), ambient sound, or narrator voice. In some implementations, the semantically labelling uses information about the audio category. For example, information related to ambient sound including how many ambient sources, position of the ambient sources, background ambient sound of one or more scenes, relative volume of ambience, type of ambient source, etc. In some implementations, the semantically labelling categories of audio sources correspond to one or more rules for how to treat each category (e.g., context related modifications) to generate re-mixed audio portions during playback of the modified AV content. In some implementations, any identified audio source that falls into a category is treated using the same techniques during playback of the modified AV content.

In some implementations, the ML is trained to recognize different types of audio. In some implementations, the classification ML may determine types of audio including sparse or not sparse, pitchy or not pitchy, directional or unidirectional, background or subject (e.g., of a scene), etc. In some implementations, the audio types are not related to physical characteristics. In some implementations, the audio types include sentimental or not sentimental, enveloping or not enveloping, militaristic or not militaristic, isolated or not isolated, background or subject (e.g., of a scene), etc. For example, sparse audio is determined based on frequency and spectral density. In some implementations, the semantically labeled audio types correspond to one or more rules for how to treat each type (e.g., context related modifications) to generate re-mixed audio portions during playback of the modified AV content.

In some implementations, the captured AV content are classified by type of environment. In some implementations, the type of environment includes AV content with (i) a human and (ii) without a human. For example, the AV content with a human is separated into a human layer and non-human layer. In another example, the AV content without a human is separated by features or identified points of focus like sky, ocean, bonfire, and sand for AV content at a beach.

In some implementations, the semantically labelling uses a human, for example, the user recording the AV content may verbally state "recording fireworks now, make the audio better". Thus, the creator of the AV content may provide clues or even instructions to enhance matching audio portions to the AV visual content for playback of the modified AV content. In some implementations, the semantically labelling is application specific, for example, based on the scene analysis of the visual content or the audio content.

In some implementations, synthesizing modified AV content for playback uses some or all information about the captured AV visual content (e.g., scene), metadata, and semantically labeled audio portions to assign selected audio portions to the AV visual content in a plausible or meaningful way. For example, if the captured AV content is walking up to a building from a distance away, the building is semantically labeled a castle, GPS metadata may be used to identify a specific theme park and the specific castle, and corresponding theme music may be used as an audio portion when the castle image dominates the visual content. In some implementations, synthesizing modified AV content for playback is based on rules that specify in which contexts various types of audio portions will be provided. In some implementations, synthesizing modified AV content for playback is based on a temporal relationship between the video content and the re-mixed labeled audio portions. In some implementations, the temporal relationship transitions between a first audio loop (e.g., a first set of one or more sequenced audio portions) for looping visual content and a second audio loop (e.g., a second different set of one or more sequenced audio portions) for the looping visual content.

Going back to the castle example, the next part of the captured AV content is people talking in the background and then fireworks exploding over the castle, and the ML networks may identify an audio portion of this next captured AV content as likely to be fireworks noise, which based on a time of day, and the theme park, confirms and segments that portion of the audio stream as fireworks (e.g., or even augments that next audio portion to 360° surround sound fireworks explosions with the same timing). In some implementations, synthesizing modified AV content for playback includes re-ordering labeled audio portions to the captured visual content to generate the modified AV content for playback. In some implementations, synthesizing modified AV content for playback generates an audio loop (e.g., a sequence of re-ordered labeled audio portions) for looping captured AV visual content.

In some implementations, playback renders synthesized AV content in an XR environment and based on context of the XR environment changes the synthesized audio (e.g., audio loop, audio portions, audio segment, etc.) with respect to the captured visual content. In some implementations, there is a default context. In some implementations, the synthesized 3D AV content is depicted on or inside virtual objects or representations of physical objects in the XR environment. In some implementations, playback displays synthesized AV content in a XR environment and based on actions of a user of the viewing electronic device with respect to the XR environment, the played back synthesized audio (e.g., audio loop, audio segment, etc.) changes with respect to the captured visual content. In some implementations, synthesized AV content is rendered in a virtual screen in the XR environment and based on actions of the user (e.g., selects, moves closer, turns away) in the XR environment relative to the virtual screen changes the synthesized audio (e.g., audio loop, audio segment, etc.) based on the action. For example, selection of the synthesized AV content rendered in an XR environment, may cause the synthesized audio loop to change from a directional point source reproduction to a 360° surround sound reproduction at an increased volume.

In some implementations, actions of the user include changing distance, the user's gaze, body orientation (e.g., facing content or not), location of user, metadata, aesthetics, etc. For example, synthesized AV content being rendered includes beach AV content that displays the sky, ocean, bonfire, and sand, and when the user looks at the bonfire, a first audio portion or first audio loop is enabled and when the user looks at the sky, sand, or ocean, a second different audio portion or second audio loop is enabled. In another example, playback displays fireworks as 3D video content in a portion of the XR environment. When the user is far away from the fireworks, the audio content is a point audio source playing only low frequency components of the firework explosions, when the user is closer the audio content becomes stereo audio source playing a complete frequency range for the fireworks explosions, and when the user is adjacent or walks into the displayed 3D fireworks, the audio content is a becomes 3D spatialized audio (e.g., augmented) for the fireworks explosions. In another example, when the captured audio content includes a narrator audio track (e.g., AV content creator), that narrator audio may be selected at any time by a user action during playback of the synthesized AV content in the XR environment.

In some implementations, synthesized AV content in an XR environment implements extended non-repeating audio playback. In some implementations, semantically labeled audio portions forming the audio content of the synthesized AV content are decomposed (e.g., by frequency) and used to generate similar but non-repeating extended audio content that is played once for multiple loops of the same AV visual content. For example, a 30 second audio portion (e.g., waves on the beach audio, forest audio) may be used to generate minutes of extended non-repeating audio content. In some implementations, extended non-repeating audio playback in an XR environment is selected by a user (e.g., or automatically implemented in the synthesized AV content based on analysis in the ML networks).

In some implementations, the captured 3D AV content is in a preset multimedia format. In some implementations, the preset format specifies file(s) that contains one or more tracks, each of which stores a particular type of data (e.g., audio, video, metadata, text, etc.). In some implementations, the preset format is 3D video format type approved by an organization that develops standards for encoding multimedia such as digital audio and video. In some implementations, the captured AV visual content is stored for reproduction (e.g., playback). In some implementations, a plurality of files can be stored as the captured AV visual content.

Figure 3:
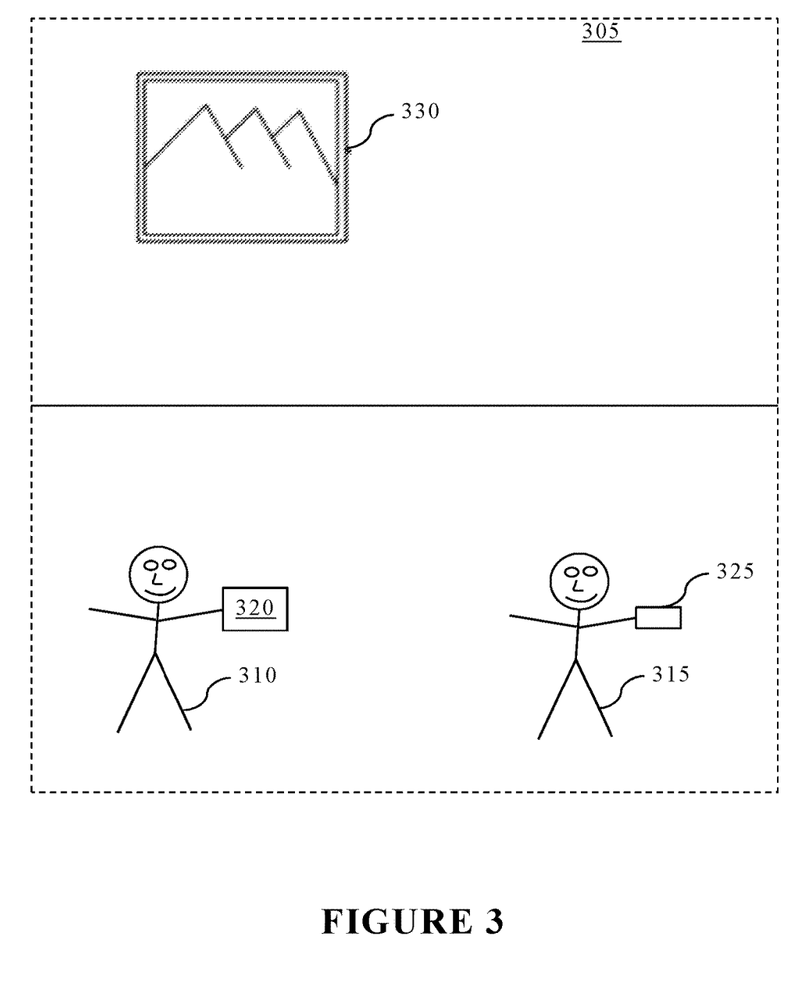
FIG. 3 is a block diagram showing an example environment.

Referring to FIG. 3, a physical environment 305 includes a first electronic device 320 being used by a first user 310 and a second electronic device 325 being used by a second user 315. In this example, the environment 305 is a room that includes picture 330. The two devices 320, 325 can operate alone or interact with additional devices not shown to capture images of the environment, detect or track objects in those images, or to present XR content based on the images and the detected/tracked objects. Each of the two devices 320, 325 may communicate wirelessly or via a wired connection with a separate controller (not shown) to perform one or more of these functions. Similarly, each of the two devices 320, 325 may store information useful for the XR environment or may communicate with a separate device such as a server or other computing device that stores this information.

In some implementations, the first electronic device 320 and the second electronic device 320 are a wearable electronic device such as a head-mounted device (HMD) or a handheld electronic device (e.g., a smartphone or a tablet) configured to present the XR environment to the first user 310, and the second user 315, respectively. The first device 320 and the second device 325 are each configured to use images or other real-world information detected based on a camera(s) or other sensor(s) to provide the XR environment.

In some implementations, the first or second device 320, 325 enable its user to change the viewpoint or otherwise modify or interact with the XR environment. In some implementations, the first or second device 320, 325 are configured to receive user input that interacts with displayed XR content. For example, a virtual object such as a 3D representation of a real-world person or object, or informational displays each with interactive commands may be presented in the XR content. A user may reposition the virtual object or informational displays relative to the depicted real objects or interact with the interactive commands by providing user input on or otherwise using the respective device.

Figure 4:
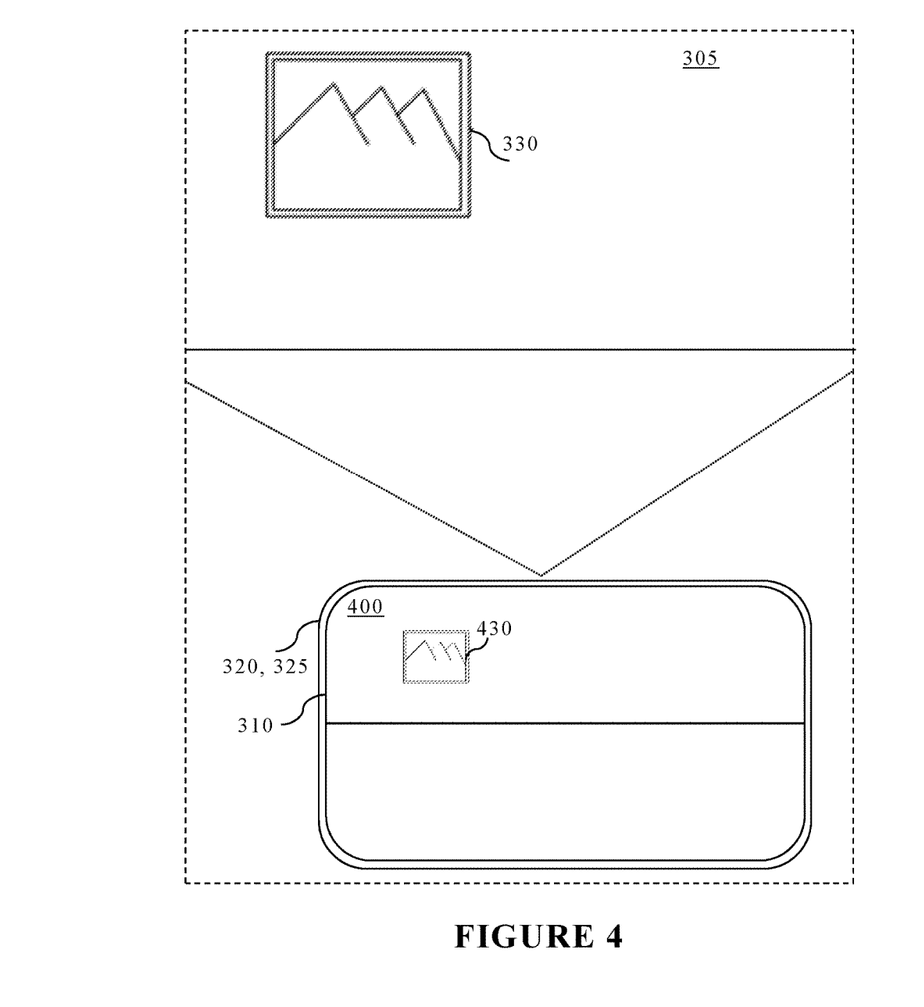
FIG. 4 is a block diagram showing a mobile device capturing a frame of a sequence of frames in the environment of FIG. 3 in accordance with some implementations.

FIG. 4 is a block diagram of the first or second device 320, 325 displaying XR environment 400 based on the physical environment 305 of FIG. 3 in a display 310 in accordance with some implementations. The XR environment 400 may be generated from a frame of a sequence of frames captured by the first or second device 320, 325, for example, when executing an application in the physical environment 305. As shown in FIG. 4, the first or second device 320, 325 displays the XR environment 400 including a depiction 430 of the picture 330. In some implementations, the XR environment 400 is shared by the first device 320 and the second device 325.

Figure 5:
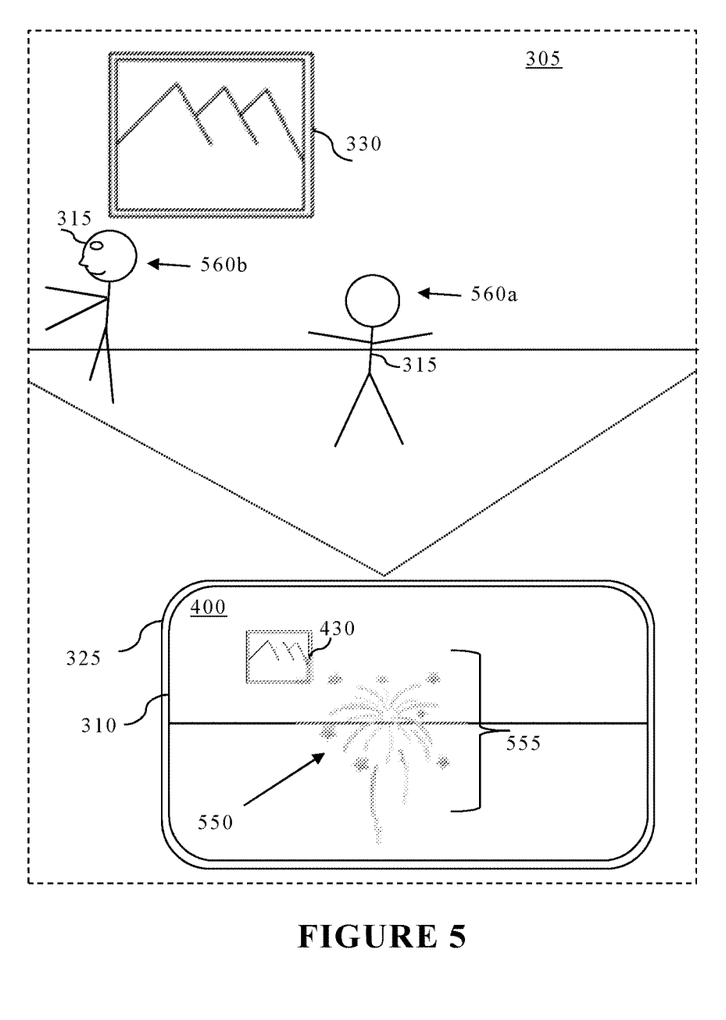
FIG. 5 is a block diagram that shows example 3D synthesized AV content presented in an XR environment in accordance with some implementations.

FIG. 5 is a diagram that shows an example synthesized 3D AV content presented in an XR environment in accordance with some implementations. In some implementations, a synthesized 3D AV content 550 is presented in a portion of the XR environment 400. As shown in FIG. 5, the 3D AV content 550 includes captured 3D visual content (e.g., fireworks) 555 displayed in the middle of the room in the XR environment 400 with selected ones or combinations of an associated plurality of labeled audio portions including firework explosions, photographer voice, a musical score, ambient cheering, and spatialized audio from forward, backward, left, and right directions. In some implementation, playback displays synthesized AV content 550 in the XR environment 400 based on actions of the second user 315 of the viewing electronic device 325 with respect to the XR environment 400, where the played back synthesized audio changes with respect to the captured visual content. For example, the played back synthesized audio changes with respect to the captured visual content based on actions by the user (e.g., movement, actions, pose such as increase volume by moving closer) or user instructions (e.g., gestures, verbal instructions, using XR content). In some implementations, synthesized audio transitions between a first audio loop including firework explosions, surround sound, and a musical score for the looping visual content 555 based on the second user 315 being at position 560a very close to and facing (e.g., inside) the looping visual content 555 and a second audio loop being muted or reduced point source or stereo audio from behind and left of the second user 315 at position 560b spaced apart from and facing away from the looping visual content 555. In one implementation, the user of the viewing electronic device is able to modulate spatialized audio either by actions (e.g., increase volume by moving closer) or user instructions (e.g., increase or decrease an audio portion from virtual speaker(s) in 3D surround sound in the XR environment.

In some implementations, additional user control is implemented by an immersion control device (e.g., physically or virtually) on the viewing electronic device is used to transition (e.g., gradually or in steps) between a reduced or minimal audio mode (e.g., single point source audio) up to an immersive audio mode (e.g., user-controlled 3D surround sound).

Figure 6:
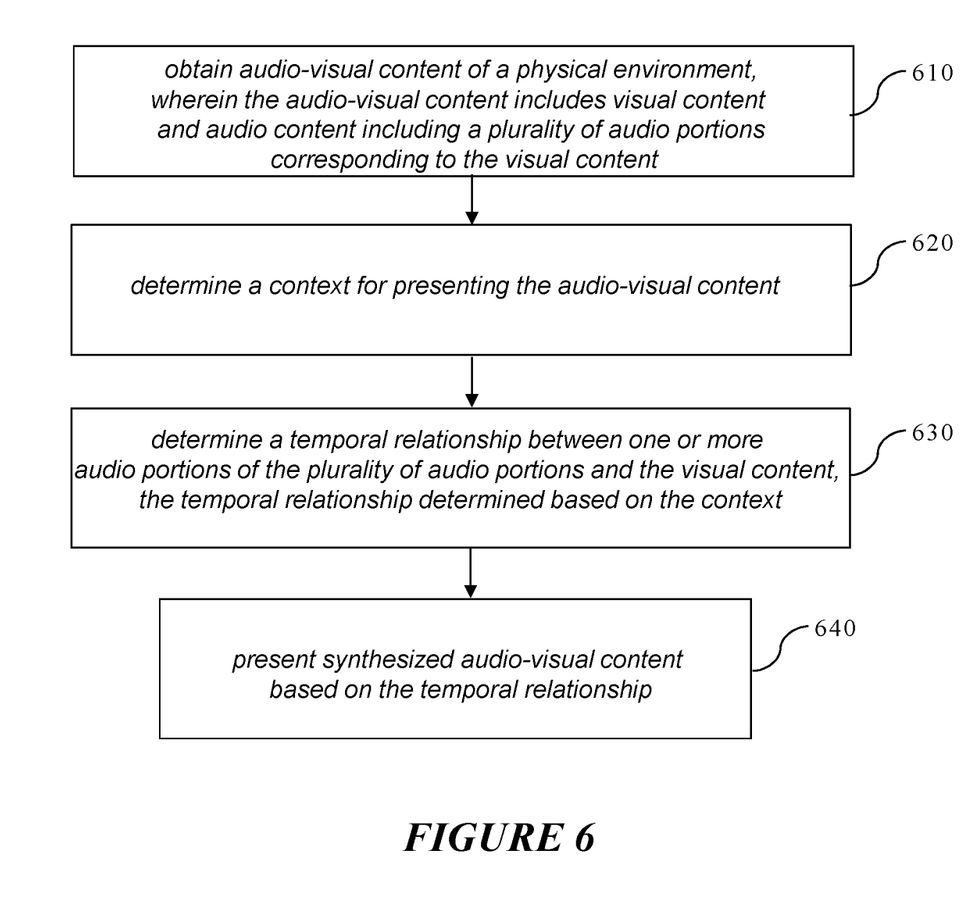
FIG. 6 is a flowchart illustrating an exemplary method of presenting audio of AV content based on context in accordance with some implementations.

FIG. 6 is a flowchart illustrating an exemplary method of rendering audio of AV content based on context in accordance with some implementations. In some implementations, a context for rendering the AV content is determined based on actions of the user in an XR environment. For example, the context for rendering the audio for the AV content includes whether the AV content is selected or unselected, whether the user is looking at or away from the AV content, or whether the user is within a prescribed distance of the AV content in the XR environment. In some implementations, the AV content may have different audio portions (e.g., a portion corresponding to the photographer's voice, a portion corresponding to sounds of a subject of the AV content such as firework explosions, a portion corresponding to an announcer/crowd, spatialized audio portions, etc.) that are analyzed and semantically labeled based on metadata or AV content analysis. In some implementations, the method 600 is performed by an electronic device (e.g., controller 110 or electronic device 120, 200 of FIGS. 1-2). The method 600 can be performed at a mobile device, HMD, desktop, laptop, server device, or by multiple devices in communication with one another. In some implementations, the method 600 is performed by processing logic, including hardware, firmware, software, or a combination thereof. In some implementations, the method 600 is performed by a processor executing code stored in a non-transitory computer-readable medium (e.g., a memory).

At block 610, the method 600 obtains AV content of a physical environment, wherein the AV content includes visual content (e.g., a 3D photo or 3D video) and audio content including a plurality of audio portions corresponding to the visual content. In some implementations, the obtained AV content may have different audio portions corresponding to an array of audio capture devices (e.g., inward and outward facing microphones) to capture audio of the physical environment. In some implementations, the plurality of audio portions includes a portion corresponding to the person capturing the AV content, ambient sounds, spatialized audio portions, etc. For example, in AV content for fireworks, the plurality of audio portions may include a portion for the voice of the fireworks AV capturer, portions for voices of nearby people in the crowd, a portion corresponding to firework sounds, a portion corresponding to an announcer, or a portion corresponding to the crowd in general. In some implementations, the plurality of audio portions forming the audio content are semantically labeled. In some implementations, metadata captured with the AV content is used to semantically label these different audio portions. In some implementations, audio analysis of the AV content is used to semantically label these different audio portions. In some implementations, analysis of the visual content captured in the AV content is used to semantically label these different audio portions. In some implementations, semantic information for the audio portions is determined by a capturing electronic device, a processing electronic device, or a playback electronic device. In some implementations, the audio content (e.g., the plurality of audio portions) is decoupled (e.g., not synchronized on a playback timeline) with the visual content of the AV content.

At block 620, the method 600 determines a context for presenting the AV content. In some implementations, the context is based on actions of the user playing back the AV content. In some implementations, the context is based on actions of the user in an XR environment including a representation of the AV content. In some implementations, the context for presenting (e.g., rendering) the audio for the AV content includes whether the AV content is selected or unselected, whether the user or user's avatar is looking at or away from the AV content, or whether the user or user's avatar is within a prescribed distance of the AV content in the XR environment. For the example of a 3D photo being the AV content, in a first context the 3D photo may be unselected or the user may be looking away, standing far away, or moving away from a representation of the 3D photo in an XR environment. In this context, the 3D photo may be provided with a loop of a selected portion of the associated audio content. In a second context, the 3D photo may be selected or the user may be looking at, standing close to, or moving towards the representation of the 3D photo. In this context, the 3D photo may be provided with different or additional portions of the associated audio (e.g., full audio/spatialized audio) as a different audio loop. As a specific example, when the user is not looking at a 3D photo of fireworks, the 3D photo may be provided with a loop of some ambient fireworks sounds but, when the user looks at the 3D photo, the 3D photo may be provided with spatialized firework sounds and audience applause.

At block 630, the method 600 determines a temporal relationship between one or more audio portions of the plurality of audio portions and the visual content, wherein the temporal relationship is determined based on the context. In some implementations, the temporal relationship is determined based on semantics of the audio portions. In some implementations, the temporal relationship is determined based on rules that specify in which contexts various types of audio portions will be provided. In some implementations, the temporal relationship transitions between a first audio loop for looping visual content and a second audio loop for the looping visual content. In some implementations, the first audio loop and the second audio loop are decoupled (e.g., not synchronized on a playback timeline) from the visual content. For example, for a still 3D photo, an audio portion may be looped. For another example, for a 3D video both the video and selected audio portions may be looped. For these examples, the temporal relationship may involve determining to loop only a firework audio portion based on the user being more than 5 feet away or determining to loop all of the audio portions (e.g., fireworks, photographer voice, announcer, cheering, etc.) based on the user being within 5 feet of the AV content in an XR environment. In some implementations, the audio portion may be enhanced or replaced (e.g., with additional firework sounds) based on the context.

At block 640, the method 600 presents or renders synthesized AV content based on the temporal relationship. In some implementations, the synthesized AV content is played back in the XR environment by a second electronic device (e.g., viewing electronic device). In some implementations, the audio content (e.g., the plurality of audio portions) is decoupled (e.g., not synchronized on a playback timeline) with the visual content of the AV content.

In some implementations, the temporal relationship between one or more audio portions of the plurality of audio portions and the visual content includes an association between a first audio loop and a static representation of the visual content and an association between a second audio loop and a looping representation of the visual content.

In some implementations, the visual content is a video, a first context is that the AV content is not selected by a user (e.g., the user is looking away from a representation of the AV content, or the user is greater than a threshold distance away from a location where the AV content is to be presented), and a first temporal relationship is determined that includes an association between a first audio loop generated based on the one or more audio portions and a first representation of the video. In some implementations, first synthesized AV content includes the first audio loop and the first representation of the video. In one implementation, the first representation of the video includes a static representation. In some implementations, a second context for presenting the AV content is determined. In some implementations, the second context is that the AV content is selected by the user (e.g., the user is looking toward the representation of the AV content, or the user is not greater than the threshold distance away from the location where the AV content is to be presented), and a second temporal relationship is determined between one or more other audio portions of the plurality of audio portions and the visual content based on the second context. In some implementations, the one or more other audio portions is different than the one or more audio portions. In some implementations, the second temporal relationship includes an association between a second audio loop generated based on the one or more other audio portions and a second representation of the video. In some implementations, second synthesized AV content is presented based on the second temporal relationship. In some implementations, the second synthesized AV content includes the second audio loop and the second representation of the video. In one implementation, the second representation of the video includes a dynamic representation. In some implementations, the second audio loop is further generated based on the one or more audio portions. In some implementations, the one or more audio portions includes a point source audio portion or an ambient audio portion. In some implementations, the one or more other audio portions includes a stereo audio portion or a spatialized audio portion.

In some implementations, the temporal relationship includes an association between a point source audio portion and the visual content, an association between a stereo audio portion and the visual content, an association between an ambient audio portion and the visual content, and an association between a spatialized audio portion and the visual content. In some implementations, the temporal relationship between one or more audio portions of the plurality of audio portions and the visual content includes an association between a first audio loop and a first representation of the visual content and an association between a second audio loop and a second representation of the visual content.

In some implementations, blocks 610-640 are repeatedly performed. In some implementations, the techniques disclosed herein may be implemented on a smart phone, tablet, or a wearable device, such as an HMD having an optical see-through or opaque display.

In some implementations, one electronic device operates as the capture electronic device or the viewing electronic device. In some implementations, multiple electronic devices (e.g., local electronic device and remote electronic device (e.g., server)) operate as the capturing electronic device or the viewing electronic device. In some implementations, the viewing electronic device provides the XR environment. In some implementations, the XR environment is a shared XR environment. In some implementations, another electronic device provides the XR environment viewed by the viewing electronic device.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel. In some implementations, a system includes a non-transitory computer-readable storage medium; and one or more processors coupled to the non-transitory computer-readable storage medium, wherein the non-transitory computer-readable storage medium includes program instructions that, when executed on the one or more processors, cause the system to perform exemplary methods disclosed herein. In some implementations, a non-transitory computer-readable storage medium, stores program instructions computer-executable on a computer to perform operations including exemplary methods disclosed herein are implemented on an electronic device including a processor.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
    at an electronic device having a processor:
        obtaining audio-visual content of a physical environment, wherein the audio-visual content comprises visual content and audio content comprising a plurality of audio portions corresponding to the visual content;
        determining a context for presenting the audio-visual content;
        determining a temporal relationship between one or more audio portions of the plurality of audio portions and the visual content, the temporal relationship determined based on the context; and
        presenting synthesized audio-visual content based on the temporal relationship.

2. The method of claim 1, wherein the plurality of audio portions comprises audio of a user of an audio-visual (AV) capture device, low frequency audio, ambient audio, or a plurality of spatialized audio streams, wherein the visual content comprises at least a 2D image, a 3D image, a 2D sequence of images or a 3D sequence of images, a 3D photo, or a 3D video including corresponding audio.

3. The method of claim 1, further comprising semantically labelling sections of the plurality of audio portions based on metadata included with the audio-visual content of the physical environment or scene analysis of the corresponding visual content.

4. The method of claim 3, wherein the metadata comprises information related to the AV capture device including pose, movement, sensors, and sensor data of the AV capture device; information related to a user of the AV capture device including gaze, body movement, and operational inputs; information related to an environment of the AV capture device during capture; or information related to a scene or the visual content.

5. The method of claim 1, further comprising semantically labelling at least one section of the plurality of audio portions based on analysis of the audio content, wherein semantically labelling at least one section of the plurality of audio portions is performed by the AV capture device, a processing electronic device, or the electronic device.

6. The method of claim 1, wherein the audio content is decoupled from the visual content.

7. The method of claim 1, wherein determining a context for presenting the audio-visual content is based on actions of a user in an extended reality (XR) environment including a representation of the audio-visual content.

8. The method of claim 1, wherein determining the context for presenting the audio-visual content comprises determining at least whether the audio-visual content is selected based on user actions and determining a spatial distance between the user and a representation of the audio-visual content.

9. The method of claim 1, wherein the temporal relationship is determined based on semantics of the plurality of audio portions.

10. The method of claim 1, wherein the temporal relationship between one or more audio portions of the plurality of audio portions and the visual content comprises an association between a first audio loop and a static representation of the visual content and an association between a second audio loop and a looping representation of the visual content.

11. The method of claim 1, wherein the temporal relationship between one or more audio portions of the plurality of audio portions and the visual content comprises an association between a point source audio portion and the visual content, an association between a stereo audio portion and the visual content, an association between an ambient audio portion and the visual content, and an association between a spatialized audio portion and the visual content.

12. The method of claim 1, wherein determining a temporal relationship between one or more audio portions of the plurality of audio portions and the visual content comprises enhancing or diminishing the audio content for the visual content.

13. The method of claim 1, wherein presenting the synthesized audio-visual content presents the visual content in or on a virtual frame.

14. The method of claim 1, wherein:
the visual content comprises a video;
the context comprises the audio-visual content being unselected by a user, the user looking away from a representation of the audio-visual content, or the user being greater than a threshold distance away from a location where the audio-visual content is to be presented;
the temporal relationship comprises an association between a first audio loop generated based on the one or more audio portions and a first representation of the video; and
the synthesized audio-visual content comprises the first audio loop and the first representation of the video.

15. The method of claim 13, wherein the one or more audio portions comprises a point source audio portion or an ambient audio portion, wherein the first representation of the video comprises a static representation.

16. The method of claim 14, further comprising:
determining a second context for presenting the audio-visual content, the second context comprising the audio-visual content being selected by the user, the user looking toward the representation of the audio-visual content, or the user not being greater than the threshold distance away from the location where the audio-visual content is to be presented;
determining a second temporal relationship between one or more other audio portions of the plurality of audio portions and the visual content based on the second context, wherein the one or more other audio portions is different than the one or more audio portions, and wherein the second temporal relationship comprises an association between a second audio loop generated based on the one or more other audio portions and a second representation of the video; and
presenting second synthesized audio-visual content based on the second temporal relationship, the second synthesized audio-visual content comprising the second audio loop and the second representation of the video.

17. The method of claim 16, wherein the one or more other audio portions comprises a stereo audio portion or a spatialized audio portion.

18. The method of claim 17, wherein the second representation of the video comprises a dynamic representation, wherein the second audio loop is further generated based on the one or more audio portions.

19. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
obtaining audio-visual content of a physical environment, wherein the audio-visual content comprises visual content and audio content comprising a plurality of audio portions corresponding to the visual content;
determining a context for presenting the audio-visual content;
determining a temporal relationship between one or more audio portions of the plurality of audio portions and the visual content, the temporal relationship determined based on the context; and
presenting synthesized audio-visual content based on the temporal relationship.

20. A non-transitory computer-readable storage medium, storing program instructions computer-executable on a computer to perform operations comprising:
at an electronic device having a processor:
obtaining audio-visual content of a physical environment, wherein the audio-visual content comprises visual content and audio content comprising a plurality of audio portions corresponding to the visual content;
determining a context for presenting the audio-visual content;
determining a temporal relationship between one or more audio portions of the plurality of audio portions and the visual content, the temporal relationship determined based on the context; and
presenting synthesized audio-visual content based on the temporal relationship.

21. The system of claim 19, wherein determining the context for presenting the audio-visual content comprises determining at least whether the audio-visual content is selected based on user actions and determining a spatial distance between the user and a representation of the audio-visual content.

22. The system of claim 19, wherein the temporal relationship between one or more audio portions of the plurality of audio portions and the visual content comprises an association between a first audio loop and a static representation of the visual content and an association between a second audio loop and a looping representation of the visual content.

23. The system of claim 19, wherein the temporal relationship between one or more audio portions of the plurality of audio portions and the visual content comprises an association between a point source audio portion and the visual content, an association between a stereo audio portion and the visual content, an association between an ambient audio portion and the visual content, and an association between a spatialized audio portion and the visual content.

24. The system of claim 19, wherein:
the visual content comprises a video;
the context comprises the audio-visual content being unselected by a user, the user looking away from a representation of the audio-visual content, or the user being greater than a threshold distance away from a location where the audio-visual content is to be presented;
the temporal relationship comprises an association between a first audio loop generated based on the one or more audio portions and a first representation of the video;
the synthesized audio-visual content comprises the first audio loop and the first representation of the video;
wherein the operations further comprise:
determining a second context for presenting the audio-visual content, the second context comprising the audio-visual content being selected by the user, the user looking toward the representation of the audio-visual content, or the user not being greater than the threshold distance away from the location where the audio-visual content is to be presented;
determining a second temporal relationship between one or more other audio portions of the plurality of audio portions and the visual content based on the second context, wherein the one or more other audio portions is different than the one or more audio portions, and wherein the second temporal relationship comprises an association between a second audio loop generated based on the one or more other audio portions and a second representation of the video; and
presenting second synthesized audio-visual content based on the second temporal relationship, the second synthesized audio-visual content comprising the second audio loop and the second representation of the video.

25. The non-transitory computer-readable storage medium of claim 20, wherein determining the context for presenting the audio-visual content comprises determining at least whether the audio-visual content is selected based on user actions and determining a spatial distance between the user and a representation of the audio-visual content.

26. The non-transitory computer-readable storage medium of claim 20, wherein the temporal relationship between one or more audio portions of the plurality of audio portions and the visual content comprises an association between a first audio loop and a static representation of the visual content and an association between a second audio loop and a looping representation of the visual content.

27. The non-transitory computer-readable storage medium of claim 20, wherein the temporal relationship between one or more audio portions of the plurality of audio portions and the visual content comprises an association between a point source audio portion and the visual content, an association between a stereo audio portion and the visual content, an association between an ambient audio portion and the visual content, and an association between a spatialized audio portion and the visual content.

28. The non-transitory computer-readable storage medium of claim 20, wherein:
the visual content comprises a video;
the context comprises the audio-visual content being unselected by a user, the user looking away from a representation of the audio-visual content, or the user being greater than a threshold distance away from a location where the audio-visual content is to be presented;
the temporal relationship comprises an association between a first audio loop generated based on the one or more audio portions and a first representation of the video;
the synthesized audio-visual content comprises the first audio loop and the first representation of the video;
wherein the operations further comprise:
determining a second context for presenting the audio-visual content, the second context comprising the audio-visual content being selected by the user, the user looking toward the representation of the audio-visual content, or the user not being greater than the threshold distance away from the location where the audio-visual content is to be presented;
determining a second temporal relationship between one or more other audio portions of the plurality of audio portions and the visual content based on the second context, wherein the one or more other audio portions is different than the one or more audio portions, and wherein the second temporal relationship comprises an association between a second audio loop generated based on the one or more other audio portions and a second representation of the video; and
presenting second synthesized audio-visual content based on the second temporal relationship, the second synthesized audio-visual content comprising the second audio loop and the second representation of the video.

* * * * *